March 12, 1957   C. E. HAHN   2,784,531
LEHR FOR CERAMIC ENAMELED GLASS BULBS
Filed Nov. 28, 1955   2 Sheets-Sheet 2

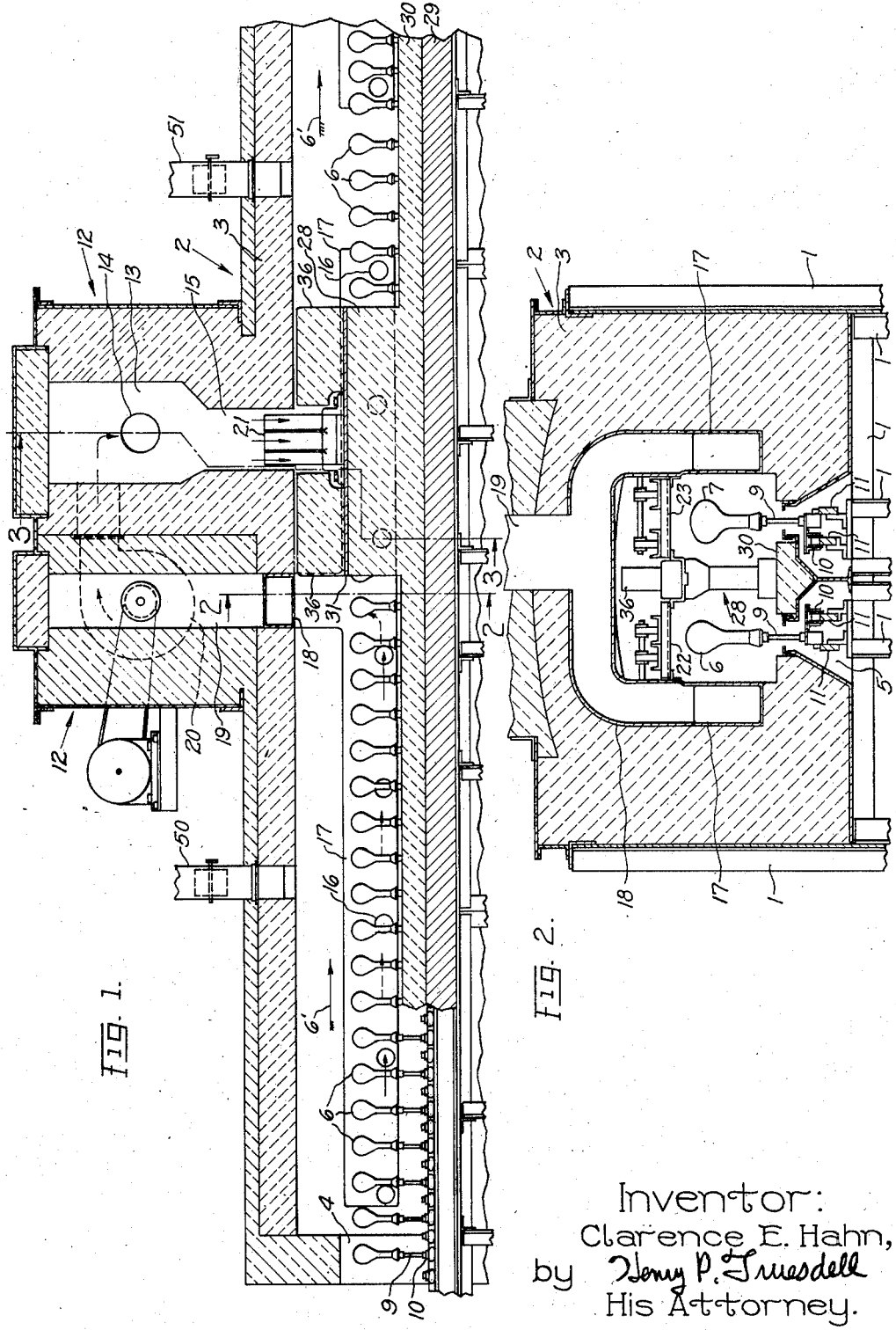

Inventor:
Clarence E. Hahn,
by Henry P. Truesdell
His Attorney.

United States Patent Office 2,784,531
Patented Mar. 12, 1957

2,784,531

LEHR FOR CERAMIC ENAMELED GLASS BULBS

Clarence E. Hahn, Willoughby, Ohio, assignor to General Electric Company, a corporation of New York Application November 28, 1955, Serial No. 549,243

6 Claims. (Cl. 49—47)

The present invention relates to glass annealing lehrs. Such lehrs are useful for fusing a coating of light-transmitting ceramic enamel to the exterior surface of glass bulbs, such as glass incandescent lamp bulbs, for example. Due to the large variety of sizes, shapes and wall thicknesses of glass incandescent lamp bulbs, the successful fusion of such coatings on bulbs of different physical characteristics in a single lehr has offered difficulties heretofore.

For example, a lehr in which a ceramic enamel coating could be successfully fused on to the entire outer surface of a glass bulb having a spherical portion and an elongated tubular neck portion and which is of substantially uniform wall thickness, is not at all suitable for fusing such a coating to glass bulbs of different shape, such as commercial bulbs of a so-called "mushroom" shape presenting a broad bowl-shaped end portion of comparatively thick glass to which portion an enamel coating is to be fused.

Among the difficulties encountered when attempts were made to use a single lehr for fusing light-transmitting enamel coatings to glass bulbs of different sizes, shapes and wall thicknesses were partial fusion only of the coating on portions of the bulb surface and, in the case of colored enamels, the occurrence of different shades of color at different portions of the coated bulb surface. These difficulties have been caused by improper temperature distribution over the walls of the ceramic enamel coated glass bulbs in conventional lehrs. Obtaining a proper temperature distribution for fusing the enamel coating onto the surface of bulbs of a wide variety of sizes, shapes and wall thicknesses in a single lehr has not been accomplished heretofore, as far as applicant is aware.

An object of the present invention is to provide a lehr for ceramic enameled glass bulbs whereby the enamel coating may be successfully fused onto bulbs of various sizes, shapes and wall thicknesses.

Another object of the invention is to provide a lehr for such bulbs whereby bulbs of different sizes, shapes and wall thicknesses may be processed simultaneously.

A further object of the invention is to provide a lehr for such coated glass bulbs which is adapted for processing bulbs of different sizes, shapes and wall thicknesses simultaneously or at different times without interrupting the operation of the lehr.

Further objects and advantages of the invention will be apparent from the accompanying drawings and the following detailed description of a species thereof.

A feature of the lehr embodying the present invention is a readily adjustable airflow control means mounted in the path of a stream of heated air entering the part of the lehr whereat the fusion of the ceramic enamel coating on the bulb surface takes place by which means the airstream is first divided and then distributed along parallel runs of ware in the lehr in such manner that by simple adjustment of the airflow control means the lehr may be quickly adapted for processing a large variety of ceramic enamel coated glass bulbs of different sizes, shapes and wall thicknesses.

In the drawing accompanying and forming part of this specification, an embodiment of the invention is shown in which:

Fig. 1 is a longitudinal, sectional elevation view of the enamel fusing section or zone of the lehr showing also, at the right of the figure, part of the annealing section or zone of the lehr;

Fig. 2 is a fragmentary, partially sectional view along the line 2—2 of Fig. 1 taken in the direction of the arrows;

Figure 3:
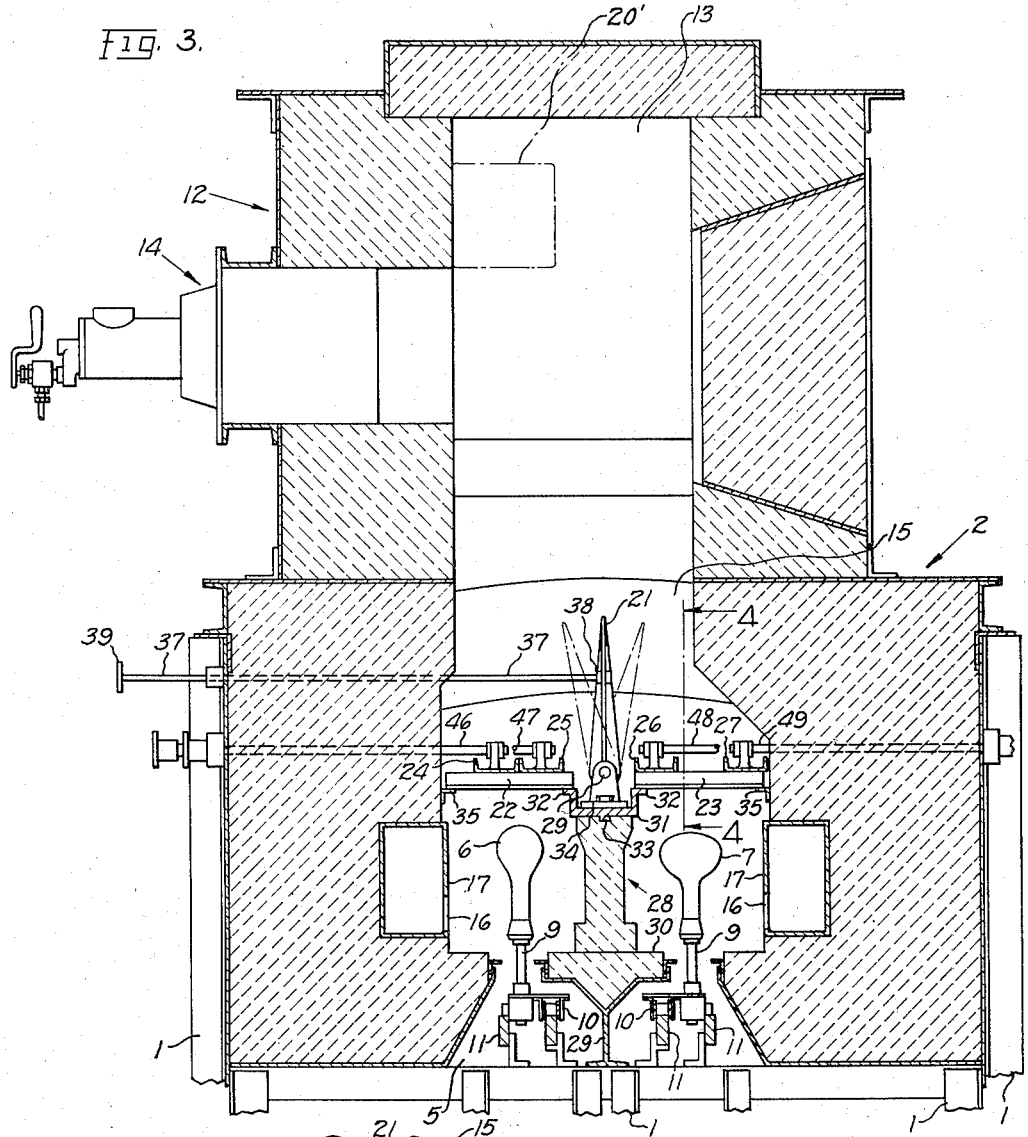
Fig. 3 is a sectional view on an enlarged scale taken along the line 3—3 of Fig. 1 in the direction of the arrows.

While the lehr has been shown in the drawings in part only for the purpose of simplicity of illustration, it will be understood that the complete lehr includes a preheat section or zone of conventional structure for the coated bulbs and that this preheat section is disposed at the left-hand side of the part of the lehr shown in Fig. 1. It will be understood, also, that the part of the lehr shown broken away at the right-hand side of Fig. 1 is part of the annealing section or zone of the lehr which zone merges with the fusing zone which is shown completely in the drawing. Hereinafter the preheat section of the lehr will be referred to as the preheat zone, the enamel fusing section as the fusing zone and the annealing section as the annealing zone of the lehr.

Referring to the drawings, the portion of the lehr shown comprises a supporting metal framework, the parts of which are shown at 1, on which is mounted a housing 2 lined with insulating material 3. The housing 2 defines an elongated, horizontal, open-ended chamber having a restricted opening 4 at one end and a partially open bottom 5 extending along its length. The glass bulbs, such as the bulbs shown at 6 and 7, to be processed by the lehr are carried through the chamber in parallel runs on a series of vertical spindles 9, mounted on roller type, continuous chain carriers 10 which travel in the direction of the arrows 6' (Fig. 1) along spaced apart parallel tracks 11 extending along the bottom opening 5. The tracks 11 are supported by members of the framework 1.

The bulbs to be processed enter the preheat zone (not shown) of the lehr from a coating apparatus and are heated in that zone to a temperature slightly below the fusion temperature of the ceramic enamel coating on the bulbs as the bulbs travel along the length of this zone. The preheated bulbs enter the enamel coating fusing zone in the housing 2 through the restricted opening 4 at the left of the housing 2 and are carried beneath the air circulating and heating apparatus shown at 12 in the drawings. In this second, or fusing zone of the lehr, the temperature of the bulbs is raised further to a temperature above the fusion temperature of the coating but below the softening temperature of the glass of the processed bulbs. The bulbs are maintained at such temperature as they travel along the second zone for a time sufficient to completely fuse the coating thereon. The third or annealing zone merges with and extends from the second zone to the end of the lehr which is shown partly broken away at the left of Fig. 1. In this last zone the ceramic enameled bulbs cool gradually to a temperature below the strain point of the glass before passing out of the lehr to a packaging table or the like (not shown).

The apparatus 12, mounted on the housing 2, for heating and circulating air in the second zone of the lehr, includes a flame receiving chamber 13 provided with a burner 14. The heated air is forced from the chamber 13, as described below and passes through a passage 15 opening into the interior of the housing 2. The air thus received in the interior of the housing 2 from the opening of passage 15 in the top wall of the housing is exhausted through spaced openings 16 in the ducts 17 which extend along the outer side of those portions of each of the bulb runs in the second or fusing zone of the lehr. The parallel ducts 17 connect, by a yoke-shaped duct 18, with a single duct 19 extending upward from the interior of the housing 2. A motor driven fan or blower assembly 20 of the centrifugal type is provided for drawing the air from the duct 19 and forcing it through an opening 20' into the flame-receiving chamber 13 and thence through the passage 15. The flow of air is indicated by the smaller arrows in Fig. 1. Thus, the heated air is reheated and recirculated through the second or enamel fusing zone of the lehr.

The above described structure of the lehr is conventional and a complete understanding of the invention may be had by those skilled in the art without further description of such parts of known structure.

In accordance with the present invention, the stream of heated air forced downward through the passage 15 extending between the flame-receiving chamber 13 and the interior housing 2 is first divided between the runs and then distributed along the length and sides of each of the runs by an airflow control means mounted in the path of the airflow into the housing 2. The airflow control means includes a pivoted baffle plate 21 mounted in the airstream to divide the stream and distribute it between the respective runs, two stationary baffles 22 and 23 in the form of grids of special shape described later herein to distribute the airflow along the bulb runs, and moveable shields 24 and 25, 26 and 27 for the baffles 22 and 23, respectively, to control the airflow over the top and sides of the coated bulbs 6 and 7 in the respective runs.

The airflow control means is supported, in part, by a partition 28 in the housing 2. The partition 28 extends between and along the runs beneath the passage 15 and away from said passage for a substantial distance in both directions as shown in Figs. 1 and 2. Thus, this portion of the interior of the housing 2 is effectively divided longitudinally to the end that the coated glass bulbs 6 and 7 of different structure carried along the spaced runs on either side of the partition 28 may be processed simultaneously and differently in this portion of the lehr, when desired.

The partition 28 is mounted on an elongated metal support 29 and an insulating body 30 extending the full length of housing 2. The support 29 is substantially V-shaped in cross-section and is secured, as by welding, to members of the framework 1, as shown. The partition 28 is made up of blocks of heat-insulating material and rests on the insulating member 30 disposed in channel-shaped top of support 29.

A channel-shaped metal support 31 having outwardly extending flanges 32 and a downwardly extending tongue 33 fitting into a groove in the top surface of the partition 28 is provided for the airflow control means. Thus, the standard 34 on which the plate 21 is pivoted is secured to the web of the channel 31, as by welding, and the baffles 22 and 23 rest on the flanges 32. Angle iron supports 35 for the grids 22 and 23 are attached to the inner surface of the side walls of the housing 2 and at a part of the walls opposite the partition 28 and at the level of the flanges 32. The partition 28 extends upward to the top of the chamber defined by the housing 2 except at the part of the partition beneath the baffle plate 21 and the passage 15, as shown in Figs. 1, 2 and 4; the upper part of the partition wall being shown at 36 in these figures.

In order to effectively divide the airstream issuing from the passage 15, the plate 21 extends upward from its pivotal axis 29 into the passage 15. The pivotal axis 29 is parallel to the direction of the bulb runs and the plate 21 extends across the width of the passage 15 as shown in Fig. 1. The passage 15 is elongated and generally rectangular in cross section and extends across the bulb runs as shown in Fig. 3. A handle 37 (Fig. 3) extending through the side wall of the housing 2 is provided for moving the plate 21 around its pivotal axis to positions on either side of a vertical plane including the axis 29 and to thereby change the relative volume of air flowing downward in the direction of the respective bulb runs.

The handle 37 is pivoted to the baffle plate 21 at a point 38 offset from the pivotal axis 29 and terminates at its outer end in a hand grip 39. A simple push or pull motion on the hand grip 39 is effective for moving the baffle plate 21 to desired positions on either side of the axis 29, the plate being shown in broken lines in Fig. 3 in two of such positions.

Figure 4:
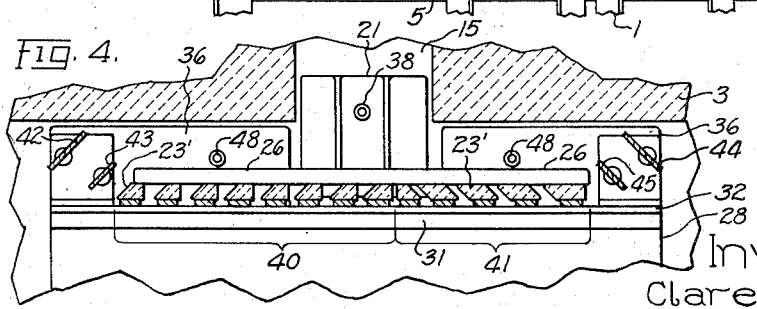
Fig. 4 is a detailed, fragmentary view along the line 4—4 of Fig. 3 taken in the direction of the arrows and showing partly in section and partly in full and on a smaller scale than Fig. 3, components of the airflow control means of the present invention.

The stationary baffles 22 and 23 for distributing the divided airstream along the respective runs on either side of the partition 28, are positioned at about the level of the pivotal axis 29 of the plate 21 and extend above the respective runs, a substantial distance in either direction from the outlet of passage 15, but terminate short of the ends of partition 28 as shown in Fig. 4.

The stationary baffles 22 and 23 are of the same structure and positioned in the same manner with respect to the bulb runs. In Fig. 4, of the drawings, the essential structure of the baffle 23 is shown in a longitudinal section to illustrate the shape in cross section of the spaced louvers 23' extending transversely of the run including the bulbs 7.

As shown in this figure the louvers of each of the baffles are arranged in groups 40 and 41 with the louvers in each group shaped and positioned to deflect the heated air flowing from the passage 15 downward at a slant toward the bulb run. The louvers in group 40 deflect the air at a downward slant in a direction generally opposite to the direction of travel of the bulbs 6, whereas the louvers in group 41 deflect the air similarly in the direction of travel of the bulbs 6.

As shown in Fig. 4, the louvers 23' at the center of the baffle 23 are spaced somewhat closer together than the louvers at the ends thereof and the distance between the surfaces of the louvers defining the openings therebetween increase slightly as the distance from the center of the grid increases. Also, the louvers in group 40 positioned at the left-hand side of the baffle shown in Fig. 4, have one side in a vertical plane and facing toward the center of the baffle and one side sloping downwardly away from the center of the baffle. The louvers in group 41 positioned at the right-hand side of the baffle of Fig. 4 have two sides sloping downwardly away from the center of the baffle with the exception of the outermost surface of the end louver.

With the louvers shaped and positioned in this manner, a greater volume of heated air is intercepted and deflected downward toward the bulbs by the louvers in group 40 than by the louvers of group 41. This is effective for quickly raising the temperature of the bulbs to the fusing temperature of the enamel coating thereon as the bulbs approach and pass under the louvers in group 40 and for maintaining the coated bulbs at such temperature as the bulbs pass under the louvers in group 41. As the bulbs continue their traevl beyond the louvers in group 41, the temperature thereof gradually lowers as the bulbs pass to the annealing zone shown at the left of Fig. 1.

In addition to the baffles 22 and 23 for directing the heated air along the runs, the lehr also comprises baffle plates 42 and 43, 44 and 45 which are pivoted on a side wall of housing 2 and are arranged in pairs at opposite ends of the baffle 23. The plates 42 and 43 are set to deflect downward at a slant toward the bulbs 7 the heated air flowing above and beyond the ends of the baffle 23. Thus, the heated air forced downward through the opening of the passage 15 and flowing toward the bulb run passing under the baffle 23 is distributed along the run by the baffle 23 and the baffle plates 42 to 45 to heat the bulb 7 in a controlled and effective manner.

It will be understood that baffle plates similar to the plates 42 to 45 are provided at the opposite ends of the baffle 22 and that such plates and the baffle 22 distribute along the run, including the bulbs 6, the air flowing thereto from the passage 15 in the manner described above in connection with baffle 23 and baffle plates 42 to 45.

The movable shields 24 and 25, 26 and 27, for controlling the flow of heated air over the top and sides of the coated bulbs carried through the region of the lehr including the baffles 22 and 23 are elongated members extending the full length of the baffles and are movably mounted in pairs on the baffles 22 and 23, respectively. The combined width of each pair of shields is slightly less than the length of the louvers of the baffles so that when the shields are pushed together, at about the longitudinal center of the baffle, as shown at the left of Figs. 2 and 3, heated air flows through the portions of the baffle openings located at the ends of the louvers and thus flows down the sides of the runs and does not flow directly toward the top of the bulbs 6. When the shields are spaced apart, as shown on the left of these figures, the heated air flows directly down to the top of the bulbs 7 and is blocked from flowing down the sides of the run.

The control of the air flowing through the baffles 22 and 23, provided by the moveable shields 24 and 25, 26 and 27, makes possible the processing of the bulbs of the different shapes characteristic of the bulbs 6 and 7 by producing an effective enamel fusing temperature at all parts of the bulb surface in spite of the different shape of the bulb.

The shields 24 and 25, 26 and 27 are mounted for sliding across the baffles 22 and 23 which is accomplished by a simple push-pull movement of the pairs of handles 46, 47, 48 and 49 attached to the shields near their ends, as shown in Fig. 4. The handles 46 to 49 extend through opposite sides of housing 2 and are provided with hand grips at their outer ends for convenience. Thus, each of the shields may be slid bodily transversely of the baffles 22 and 23 and independently of the other shields to block the flow of air through selected longitudinally extending portions of the baffles to the end that lamp bulbs of various sizes, shapes and wall thicknesses may be effectively processed by the lehr.

While the shields have been shown in their two extreme positions in Figs. 2 and 3 for the heat treatment of bulbs of particular shape, it will be understood, of course, that the shields may be arranged in positions intermediate to those shown when bulbs of different sizes, shapes and wall thicknesses from those illustrated are being processed in the lehr.

The lehr is provided with the usual damper flues 50 and 51 for the exhaust gases.

The airflow control means of the lehr of the present invention, by distributing the heated air in a manner to quickly heat the bulbs a proper temperature, such as a temperature of the order of 600° C. and higher, for fusing the enamel coating at all parts of the coated surface of the processed bulbs reduces the time required for processing such bulbs in the lehr to thus increase the capacity of the lehr. For example, with ceramic enamel coated bulbs of pear shape, such as the PS–30 bulbs shown at 6 in the drawings having a maximum outer diameter of three and three-quarter inches, it has proved possible to process approximately 50% more of such bulbs in a given time in a lehr embodying the present invention than in a lehr of similar structure but not incorporating the airflow control means of this invention. The increase in rate of bulb processing is even greater with bulbs of smaller size, such as bulbs of the type designated commercially as the C–7½ bulb which has a maximum outer diameter slightly less than one inch. With the latter size of bulb it has proved possible to process such bulbs at a rate approximately 60% faster than obtained with prior lehrs.

Further, ceramic enamel coated bulbs of a size and shape which have not been successfully processed in large numbers in lehrs of prior types, such as bulbs designated commercially as R–40 bulbs and shown at 7 in the drawings, which are four and one-half inches in maximum outer diameter, are successfully processed in the lehr of the present invention. Thus, it is possible for the first time to process both types of coated bulbs, the PS–30 and the R–40 bulbs, simultaneously in a single lehr and at a high rate as the result of the airflow control means of the present invention.

What I claim as new and desire to secure by Letters Patent of the United States is:

1. A lehr comprising an elongated housing, means for conveying ceramic enamel coated glass bulbs in two parallel spaced runs through said housing, means for supplying heated air to the interior of said housing through an opening into said housing above said runs and between the ends of said housing, a partition between said runs and dividing the interior of said housing longitudinally in the region of said opening and means mounted in the path of heated air flowing downward through said opening for distributing between and along said runs air flowing through said opening into said housing, said air distributing means comprising a baffle plate mounted on said partition above the level of the bulbs in said runs and extending substantially across the full width of the path of a stream of air flowing downward through said opening to divide said path, said plate being pivoted on an axis parallel with said runs and being manually adjustable to positions to either side of the vertical whereby to control the distribution between said runs of heated air from said passage, said means comprising also elongated stationary baffles mounted in the divided path of the air stream and directly above and extending along each of said runs, each of said baffles having louvers extending transversely of said runs with air deflecting surfaces of said louvers sloping downwardly in opposite directions from the center of said baffles whereby air from said passage passing through the stationary baffles is deflected along both said runs in opposite directions from said baffles and the temperature of the bulbs traveling along said runs and under said baffles is gradually increased to the fusing temperature of said coating as the ware approaches said baffles and gradually decreases as the ware leaves said baffles.

2. A lehr comprising an elongated housing having an elongated transverse opening in its top wall, a partition extending along the interior of said housing beneath and beyond said opening a substantial distance in both directions to divide the interior of said housing longitudinally in the region of said opening, means for conveying glass bulbs through said lehr in two parallel spaced runs extending along opposite sides of said partition, means for forcing a stream of heated air downward through said opening, and airflow control means for distributing between and along said runs the stream of heated air from said opening, said airflow control means comprising a baffle plate pivoted on said partition and on an axis parallel thereto and extending into and across said opening to divide the airstream flowing from said opening, said airflow control means comprising also elongated stationary baffles mounted in the divided airstream and directly above each of said runs, each of said baffles having spaced transverse louvers provided with air deflecting surfaces to direct air from said stream along said runs in opposite directions from the said baffles and a pair of elongated shields mounted for transverse movement on and extending longitudinally of each of said stationary baffles, the combined width of each of said pairs of shields being less than the width of the baffle on which it is mounted, said shields being moveable independently of each other transversely of said baffle to block the flow of air through selected portions of said baffle whereby to control the distribution of air from said divided airstream across each of said runs.

3. A lehr comprising an elongated housing having an elongated transverse opening in its top wall, a partition extending along the interior of said housing beneath and beyond said opening a substantial distance in both directions to divide the interior of said housing longitudinally in the region of said opening, means for conveying glass bulbs through said lehr in two parallel spaced runs extending along opposite sides of said partition, means for forcing a stream of heated air downward through said opening, and airflow control means for distributing between and along said runs the stream of heated air from said opening, said airflow control means comprising a baffle plate pivoted on said partition and on an axis parallel thereto and extending into and across said opening to divide the airstream flowing from said opening, said airflow control means comprising also elongated stationary baffles mounted in the divided airstream and directly above each of said runs, each of said baffles having spaced transverse louvers provided with air deflecting surfaces to direct air from said stream along said runs in opposite directions from the said baffles, a pair of adjustable baffle plates mounted at each end of said stationary baffles and a pair of elongated shields mounted for transverse movement on and extending longitudinally of each of said stationary baffles, the combined width of each of said pairs of shields being less than the width of the baffle on which it is mounted, said shields being moveable independently of each other transversely of said baffle to block the flow of air through selected portions of said baffle whereby to control the distribution of air from said divided airstream across each of said runs.

4. A lehr comprising an elongated housing having an opening in its top wall, means for conveying enamel coated glass bulbs through said housing and past said opening in an horizontal straight run, means for forcing a stream of heated air vertically downward through said opening and toward said run and means mounted in said housing below said opening and above said run for distributing the stream of heated air from said opening along said run in both directions from said opening, said means comprising an elongated horizontal stationary baffle extending along said run and across and beyond said opening in both directions to intercept the airstream from said opening, said baffle having spaced transverse louvers provided with opposed air deflecting surfaces, said louvers being arranged in two groups, one on either side of said baffle, the louvers in the group at the bulb approach end of said baffle each having one vertical air deflecting surface facing toward the center of the baffle and one air deflecting surface sloping downwardly away from the center of the baffle, the louvers in the group at the opposite end of the baffle each having two air deflecting surfaces sloping downwardly away from the center of the baffle whereby bulbs carried along said run by said conveying means are rapidly heated by air from said stream to an elevated temperature as said bulbs approach the center of said baffle and are maintained at such temperature while leaving the center of said baffle.

5. A lehr comprising an elongated housing having an opening in its top wall, means for conveying enamel coated glass bulbs through said housing and past said opening in an horizontal straight run, means for forcing a stream of heated air vertically downward through said opening and toward said run and means mounted in said housing below said opening and above said run for distributing the stream of heated air from said opening along said run in both directions from said opening, said means comprising an elongated horizontal stationary baffle extending along said run and across and beyond said opening in both directions to intercept the airstream from said opening, said baffle having spaced transverse louvers provided with opposed air deflecting surfaces, said louvers being arranged in two groups, one on either side of said baffle, the louvers in the group at the bulb approach end of said baffle each having one vertical air deflecting surface facing toward the center of the baffle and one air deflecting surface sloping downwardly away from the center of the baffle, the louvers in the group at the opposite end of the baffle each having two air deflecting surfaces sloping downwardly away from the center of the baffle, the spacing between said louvers being greater at the ends of said baffle than at the center thereof whereby bulbs carried along said run by said conveying means are rapidly heated by air from said stream to an elevated temperature as said bulbs approach the center of said baffle and are maintained at such temperature while leaving the center of said baffle.

6. A lehr comprising an elongated housing having an opening in its top wall, means for conveying enamel coated glass bulbs through said housing and past said opening in an horizontal straight run, means for forcing a stream of heated air vertically downward through said opening and toward said run and means mounted in said housing below said opening and above said run for distributing the stream of heated air from said opening along said run in both directions from said opening, said means comprising an elongated horizontal stationary baffle extending along said run and across and beyond said opening in both directions to intercept the airstream from said opening, said baffle having spaced transverse louvers provided with air deflecting surfaces to direct air from said stream along said run in opposite directions from said baffle and a pair of elongated shields mounted for transverse movement on and extending longitudinally of said baffles, the combined width of said shields being less than the width of said baffles, said shields being moveable independently of each other transversely of said baffle to block the flow of air through selected portions of said baffle whereby to control the distribution of air from said stream across said run.

References Cited in the file of this patent
UNITED STATES PATENTS

| | | |
|---|---|---|
| 1,766,545 | Rendall | June 24, 1930 |
| 1,838,143 | Hoge | Dec. 29, 1931 |
| 2,066,374 | Walters | Jan. 5, 1937 |
| 2,120,947 | Amsler | June 14, 1938 |